(12) United States Patent
Yogo et al.

(10) Patent No.: US 9,931,610 B2
(45) Date of Patent: Apr. 3, 2018

(54) CARBON DIOXIDE SEPARATING MATERIAL AND METHOD FOR SEPARATION OR RECOVERY OF CARBON DIOXIDE

(71) Applicant: RESEARCH INSTITUTE OF INNOVATIVE TECHNOLOGY FOR THE EARTH, Kyoto (JP)

(72) Inventors: Katsunori Yogo, Kyoto (JP); Firoz Alam Chowdhury, Kyoto (JP); Hidetaka Yamada, Kyoto (JP)

(73) Assignee: Research Institute of Innovative Technology for the Earth, Kyoto (JP)

( * ) Notice: Subject to any disclaimer, the term of this patent is extended or adjusted under 35 U.S.C. 154(b) by 326 days.

(21) Appl. No.: 14/899,478

(22) PCT Filed: Jun. 27, 2014

(86) PCT No.: PCT/JP2014/067107
§ 371 (c)(1),
(2) Date: Dec. 17, 2015

(87) PCT Pub. No.: WO2014/208712
PCT Pub. Date: Dec. 31, 2014

(65) Prior Publication Data
US 2016/0144340 A1 May 26, 2016

(30) Foreign Application Priority Data

Jun. 28, 2013 (JP) ................. 2013-135873

(51) Int. Cl.
| | | |
|---|---|---|
| *B01D 53/02* | (2006.01) | |
| *B01J 20/26* | (2006.01) | |
| *B01J 20/06* | (2006.01) | |
| *B01J 20/08* | (2006.01) | |
| *B01J 20/18* | (2006.01) | |
| *B01J 20/20* | (2006.01) | |
| *B01J 20/28* | (2006.01) | |
| *B01J 20/32* | (2006.01) | |
| *B01J 20/34* | (2006.01) | |

(Continued)

(52) U.S. Cl.
CPC ............ *B01J 20/261* (2013.01); *B01D 53/02* (2013.01); *B01J 20/06* (2013.01); *B01J 20/08* (2013.01); *B01J 20/103* (2013.01); *B01J 20/165* (2013.01); *B01J 20/18* (2013.01); *B01J 20/20* (2013.01); *B01J 20/28057* (2013.01); *B01J 20/28059* (2013.01); *B01J 20/28061* (2013.01); *B01J 20/28064* (2013.01); *B01J 20/28066* (2013.01); *B01J 20/28069* (2013.01); *B01J 20/28071* (2013.01); *B01J 20/28073* (2013.01); *B01J 20/28076* (2013.01); *B01J 20/321* (2013.01); *B01J 20/3204* (2013.01); *B01J 20/3272* (2013.01); *B01J 20/3433* (2013.01); *B01J 20/3483* (2013.01); *C01B 32/50* (2017.08); *B01D 53/047* (2013.01); *B01D 53/0462* (2013.01); *B01D 2253/102* (2013.01); *B01D 2253/108* (2013.01); *B01D 2253/202* (2013.01); *B01D 2253/25* (2013.01); *B01D 2253/306* (2013.01); *B01D 2253/308* (2013.01); *B01D 2256/22* (2013.01); *B01D 2257/504* (2013.01); *B01D 2258/06* (2013.01); *Y02C 10/04* (2013.01); *Y02C 10/06* (2013.01); *Y02C 10/08* (2013.01); *Y02P 20/152* (2015.11)

(58) Field of Classification Search
CPC ........ B01D 2253/102; B01D 2253/108; B01D 2253/202; B01D 2253/25; B01D 2253/306; B01D 2253/308; B01D 2256/22; B01D 2257/504; B01D 2258/06; B01D 53/02; B01D 53/0462; B01D 53/047; B01J 20/06; B01J 20/08; B01J 20/103; B01J 20/165; B01J 20/18; B01J 20/20; B01J 20/261; B01J 20/28057; B01J 20/28059; B01J 20/28061; B01J 20/28064; B01J 20/28066; B01J 20/28069; B01J 20/28071; B01J 20/28073; B01J 20/28076; B01J 20/3204; B01J 20/321; B01J 20/3272; B01J 20/3433; B01J 20/3483; C01B 32/50; Y02C 10/04; Y02C 10/06; Y02C 10/08; Y02P 20/152

See application file for complete search history.

(56) References Cited

U.S. PATENT DOCUMENTS

| | | | |
|---|---|---|---|
| 4,094,957 A | 6/1978 | Sartori et al. | |
| 4,217,238 A | 8/1980 | Sartori et al. | |

(Continued)

FOREIGN PATENT DOCUMENTS

| | | | |
|---|---|---|---|
| JP | 53-081490 A | 7/1978 | |
| JP | H09-141040 A | 6/1997 | |

(Continued)

OTHER PUBLICATIONS

Hakkinen et al., "Synthesis of novel deuterium labelled derivatives of N-alkylated polyamines," Tetrahedron, 2009, vol. 65, No. 2, pp. 547-562.

(Continued)

*Primary Examiner* — Christopher P Jones
(74) *Attorney, Agent, or Firm* — MH2 Technology Law Group, LLP

(57) ABSTRACT

Disclosed are a carbon dioxide separating material comprising a polyamine carrier in which a polyamine having at least two isopropyl groups on one or more of the nitrogen atoms is loaded on a support, and a method for separating or recovering carbon dioxide using the carbon dioxide separating material.

10 Claims, 1 Drawing Sheet

(51) Int. Cl.
  *B01J 20/16* (2006.01)
  *B01J 20/10* (2006.01)
  *C01B 32/50* (2017.01)
  *B01D 53/04* (2006.01)
  *B01D 53/047* (2006.01)

(56) References Cited

U.S. PATENT DOCUMENTS

| | | | |
|---|---|---|---|
| 4,629,476 A * | 12/1986 | Sutt, Jr. | B01D 53/02 |
| | | | 95/138 |
| 6,364,938 B1 | 4/2002 | Birbara et al. | |
| 6,908,497 B1 | 6/2005 | Sirwardane | |
| 7,288,136 B1 | 10/2007 | Gray et al. | |
| 8,541,622 B2 * | 9/2013 | Blair | B01D 53/1456 |
| | | | 423/228 |
| 2008/0090922 A1 | 4/2008 | Vedage et al. | |
| 2008/0121104 A1 * | 5/2008 | Quinn | B01D 19/0404 |
| | | | 95/135 |
| 2009/0199709 A1 * | 8/2009 | Rojey | B01D 53/1425 |
| | | | 95/46 |
| 2010/0326276 A1 * | 12/2010 | Blair | B01D 53/1462 |
| | | | 95/205 |
| 2011/0268618 A1 * | 11/2011 | Finkenrath | B01D 53/229 |
| | | | 422/169 |
| 2011/0293498 A1 | 12/2011 | Lahary et al. | |
| 2012/0282160 A1 * | 11/2012 | Just | B01D 53/1462 |
| | | | 423/228 |
| 2013/0261270 A1 * | 10/2013 | Butikofer | C07C 211/09 |
| | | | 525/423 |
| 2015/0321139 A1 * | 11/2015 | Schraven | B01D 53/1475 |
| | | | 95/174 |

FOREIGN PATENT DOCUMENTS

| | | |
|---|---|---|
| JP | 2008111118 A | 5/2008 |
| JP | 2010-119958 A | 6/2010 |
| JP | 2012055886 A | 3/2012 |
| JP | 2012-139622 A | 7/2012 |
| WO | 2008021700 A1 | 2/2008 |
| WO | 2010/037967 A2 | 4/2010 |
| WO | 2011/009195 A1 | 1/2011 |

OTHER PUBLICATIONS

Office Action dated Oct. 10, 2017 for Japanese Patent Application No. 2013-135873, pp. 1-7 (including machine translation).

Yasushi Takeuchi, Saishin Kyuchaku Gijutsu Binran, 1st edition, Kabushiki Kaisha NTS, Jan. 11, 1999, p. 847.

* cited by examiner

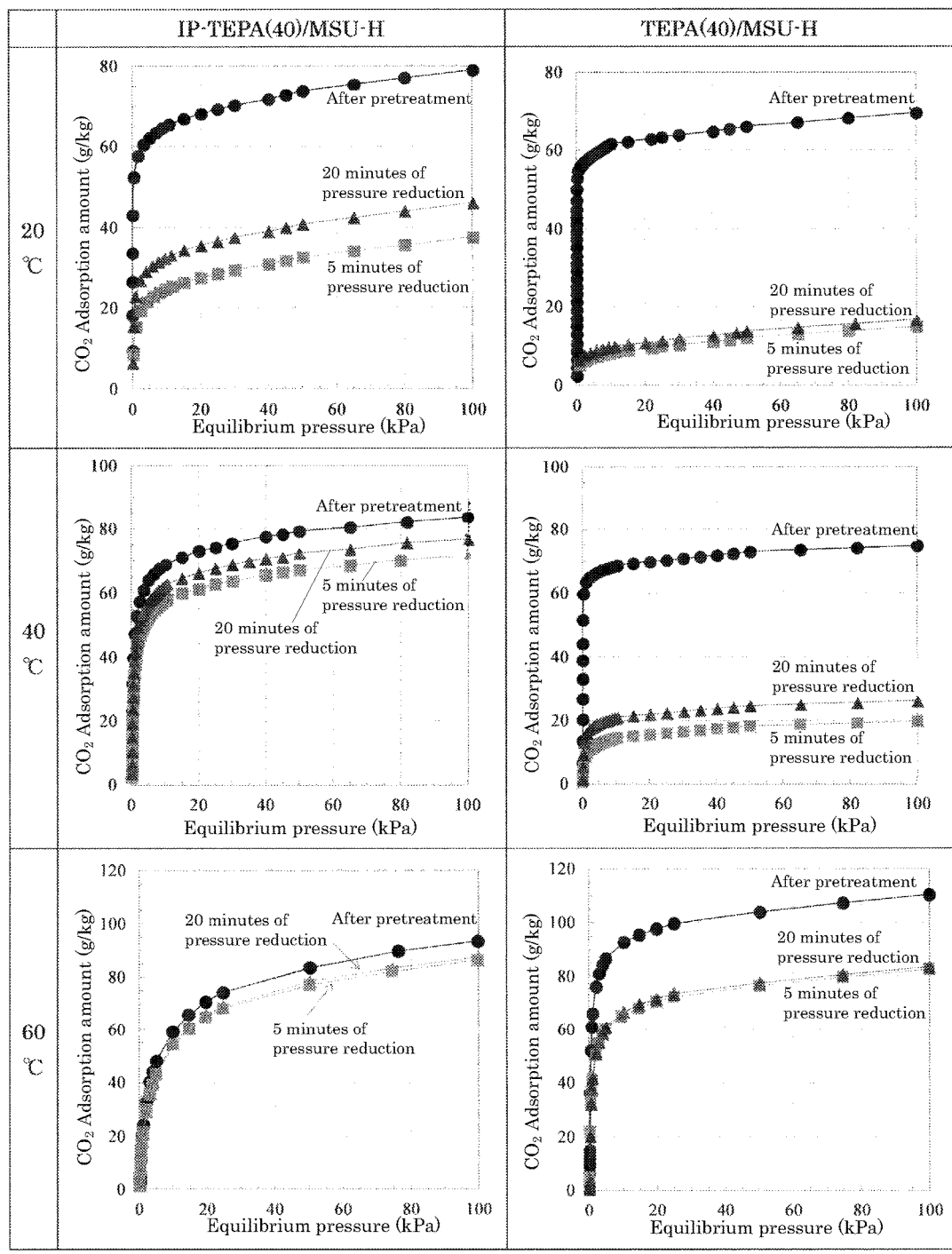

CARBON DIOXIDE SEPARATING MATERIAL AND METHOD FOR SEPARATION OR RECOVERY OF CARBON DIOXIDE

CROSS-REFERENCE TO RELATED APPLICATIONS

This application is a U.S. National Stage application of PCT/JP2014/067107 filed 27 Jun. 2014, which claims priority to Japanese Application No. 2013-135873 filed 28 Jun. 2013, the entire disclosures of which are hereby incorporated by reference in their entireties.

TECHNICAL FIELD

The present invention relates to a carbon dioxide separating material, and a method for separating or recovering carbon dioxide.

BACKGROUND ART

In recent years, climate changes and frequently occurring disasters, which are presumably attributable to global warming, have had a serious impact on agricultural production, the living environment, energy consumption, and the like. Carbon dioxide in the atmosphere has been of interest as a substance that causes global warming. Examples of carbon dioxide sources include thermal power plants using coal, heavy oil, natural gas, or other fuels; blast furnaces of ironworks where iron oxide is reduced with coke; converters of ironworks where carbon in pig iron is combusted to produce steel; factory boilers; cement plant kilns; and transportation equipment, such as automobiles, ships, and aircraft, using gasoline, heavy oil, light oil, or other fuels. Except for transportation equipment, these carbon dioxide sources are fixed facilities, which are expected to allow easy adaptation to implementation measures for reducing carbon dioxide emissions, and there have thus been attempts to develop methods for separating and recovering carbon dioxide from gases exhausted from these sources.

In addition to the above, attempts have been made to separate and recover carbon dioxide generated, for example, by people breathing and from energy conversion of apparatuses in enclosed spaces, such as deep-submersible vehicles and space stations, and to release the carbon dioxide from the enclosed spaces.

To achieve these objects, the development of a carbon dioxide separating material has been in demand that is capable of stably separating and recovering carbon dioxide and that is capable of repeatedly and continuously separating and recovering carbon dioxide in an efficient manner even under expected conditions of use in a thermal power station and the like (e.g., a carbon dioxide partial pressure of 7 to 100 kPa, 40 to 60° C.) or in a space station and the like (e.g., a carbon dioxide partial pressure of 0 to 1 kPa, 20 to 25° C.). Additionally, from the viewpoint of practical use, the development of a carbon dioxide separating material has been in demand that can downsize a separation and recovery apparatus, and that can be an energy-saving apparatus.

Examples of a method for releasing or recovering carbon dioxide from a carbon dioxide separating material in which carbon dioxide is absorbed include a method for releasing carbon dioxide by heating a carbon dioxide separating material or a container to increase the temperature (a temperature swing method), a method for releasing carbon dioxide by reducing the carbon dioxide partial pressure inside a container containing a carbon dioxide separating material through a depressurizing operation (a pressure swing method), and the like. A carbon dioxide separating material has been in demand that is suitable for any release and recovery method, that absorbs carbon dioxide in a great amount, that achieves a high release rate, that provides a short absorption-release cycle, and that is efficient and highly practical.

As a method for removing carbon dioxide from environmental gas inside a pressurized enclosed space, Patent Literature (PTL) 1 discloses a method for pressurizing the environmental gas and bringing the gas into contact with a dehumidification agent for dehumidification, followed by the removal of carbon dioxide by using a zeolite. However, in the method of PTL 1, which requires dehumidification of the target gas, the gas must be transferred from an enclosed space to a dehumidification tower, then to an absorption tower. This means that downsizing the apparatus is limited.

Patent Literature (PTL) 2 discloses a solid carbon dioxide absorption material in which 2-isopropylaminoethanol is loaded on a support.

Patent Literature (PTL) 3 to 5 disclose a carbon dioxide absorption material that uses a compound having OH or acrylonitrile at one or more of the ends. However, these solid carbon dioxide separating materials aim to solve problems found, for example, in downsizing equipment and in reusing the carbon dioxide separating material. Therefore, a carbon dioxide separating material that achieves a more increased $CO_2$ release amount and a higher $CO_2$ release rate, and that is more efficient and more practical has been in demand.

CITATION LIST

Patent Literature

PTL 1: JPH09-141040A
PTL 2: JP2012-139622A
PTL 3: U.S. Pat. No. 7,288,136
PTL 4: U.S. Pat. No. 6,908,497
PTL 5: U.S. Pat. No. 6,364,938

SUMMARY OF INVENTION

Technical Problem

An object of the present invention is to provide a carbon dioxide separating material that is capable of not only highly efficiently absorbing carbon dioxide, but also highly efficiently releasing carbon dioxide from a solid absorption material in which carbon dioxide is absorbed, and also achieving the recovery of high-purity carbon dioxide.

Another object of the present invention is to provide a carbon dioxide separating material suitable for use in both a temperature swing method and a pressure swing method, which serves as a method for releasing and recovering carbon dioxide.

Solution to Problem

The present inventors conducted extensive research on a carbon dioxide separating material that is capable of efficiently absorbing and releasing carbon dioxide to recover high-purity carbon dioxide. As a result, the inventors found that such a function can be achieved by using polyamine having at least two isopropyl groups on one or more of the nitrogen atoms. The present invention has thus been accomplished.

More specifically, the present invention provides the carbon dioxide separating materials of the following Items 1 to 8, as well as the methods of the following items 9 and 10 for releasing or recovering carbon dioxide.

Item 1. A carbon dioxide separating material comprising a polyamine carrier in which a polyamine having at least two isopropyl groups on one or more of the nitrogen atoms is loaded on a support.

Item 2. The carbon dioxide separating material according to Item 1, wherein the polyamine is represented by Formula (1):

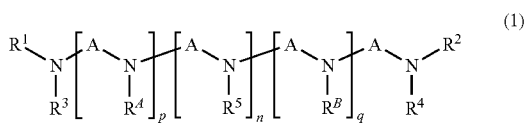

wherein $R^A$ represents $R^6$ or a group: $-A-NR^6R^7$,
$R^B$ represents $R^8$ or a group: $-A-NR^8R^9$,
$R^1$ to $R^3$ each independently represent hydrogen or isopropyl,
A represents $C_{2-6}$ alkylene,
n represents an integer of 0 to 5,
p and q each independently represent 0 or 1,
wherein
a plurality of A may each be identical or different, and when there is a plurality of $R^5$, each $R^5$ may be identical or different, with the proviso that two or more of $R^1$ to $R^3$ of the formula represent isopropyl.

Item 3. The carbon dioxide separating material according to Item 1 or 2, wherein the polyamine has a boiling point of 320° C. or higher at 760 mmHg.

Item 4. The carbon dioxide separating material according to any one of Items 1 to 3, wherein the polyamine is at least one member selected from the group consisting of diisopropylated tetraethylenepentamine, diisopropylated spermine, tetraisopropylated N,N,N',N'-tetrakis (3-aminopropyl)-1,4-butanediamine, diisopropylated pentaethylenehexamine, diisopropylated hexaethyleneheptamine, and diisopropylated triethylenetetramine.

Item 5. The carbon dioxide separating material according to any one of Items 1 to 4, wherein the support is mesoporous silica, polymethyl methacylate, alumina, silica alumina, clay minerals, magnesia, zirconia, a zeolite, a zeolite-related compound, a natural mineral, a waste solid, an activated carbon, a carbon molecular sieve, or a mixture thereof.

Item 6. The carbon dioxide separating material according to any one of Items 1 to 5, wherein the support has a specific surface area (BET) of 50 $m^2/g$ or more and 1,000 $m^2/g$ or less, and a pore volume of 0.1 to 2.3 $m^3/g$.

Item 7. A carbon dioxide separating material comprising granulations containing the polyamine carrier of any one of Items 1 to 6 and a binder.

Item 8. The carbon dioxide separating material according to Item 7, wherein the binder is at least one member selected from the group consisting of fluororesins, cellulose derivatives, and mixtures of epoxy resins with epoxy resin curing agents.

Item 9. A method for separating or recovering carbon dioxide, the method comprising the steps of:
bringing target gas into contact with the carbon dioxide separating material of any one of Items 1 to 8 to allow carbon dioxide to be absorbed into the carbon dioxide separating material (step 1); and
releasing carbon dioxide from the carbon dioxide separating material into which carbon dioxide is absorbed in step 1 (step 2),
wherein step 2 comprises any one of the following:
(A) a method for releasing carbon dioxide by subjecting the carbon dioxide separating material to reduced pressure conditions (a pressure swing method),
(B) a method for releasing carbon dioxide by bringing carbon dioxide-free inert gas into contact with the carbon dioxide separating material, and
(C) a method for releasing carbon dioxide by heating the carbon dioxide separating material (a temperature swing method).

Item 10. The method for releasing or recovering carbon dioxide according to Item 9, wherein the target gas has a temperature of 20 to 60° C. and a carbon dioxide partial pressure of 100 kPa or less, and wherein step 2 above comprises method (A).

Advantageous Effects of Invention

The carbon dioxide separating material of the present invention achieves an increased amount of carbon dioxide absorption, and enables separation and recovery of a large amount of carbon dioxide with a short-time pressure reduction. The carbon dioxide separating material of the present invention is thus more efficient and practical, and is suitable for reuse.

Both in a pressure swing method and a temperature swing method, the carbon dioxide separating material of the present invention is capable of separating and recovering carbon dioxide in carbon dioxide absorption and release steps. It is thus possible to select a carbon dioxide absorption and release step suitable for a variety of use environments.

Additionally, the carbon dioxide separating material of the present invention does not suffer from a reduction in performance of the absorption, release, and reabsorption even when water vapor coexists, and does not require a dehumidification step. This makes it possible to construct energy-saving systems, and to reduce cost because the apparatus can be downsized.

BRIEF DESCRIPTION OF DRAWINGS

FIG. 1 shows graphs of carbon dioxide absorption isotherms at each temperature with respect to a carbon dioxide separating material. These graphs show the amount of carbon dioxide absorption and the amount of carbon dioxide reabsorption after pressure reduction at each temperature of 20, 40, and 60° C. at a carbon dioxide partial pressure within a range of 0 to 100 kPa when IP-TEPA (40)/MSU-H or TEPA (40)/MSU-H was used.

DESCRIPTION OF EMBODIMENTS

The following describes the present invention in detail.
The carbon dioxide separating material of the present invention comprises a polyamine carrier in which a polyamine having at least two isopropyl groups on one or more of the nitrogen atoms is loaded on a support.

The verb "comprise" as used herein includes the meanings of "contain," "substantially consist of," and "consist of."

1. Polyamine Having at Least Two Isopropyl Groups on One or More of the Nitrogen Atoms (IP-Polyamine)

The polyamine contained in the carbon dioxide separating material of the present invention has at least two isopropyl groups on one or more of the nitrogen atoms (hereinafter sometimes referred to as "IP-polyamine").

The IP-polyamine is preferably represented by Formula (1):

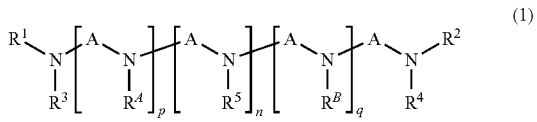

wherein $R^A$ represents $R^6$ or a group: -A-$NR^6R^7$,
$R^B$ represents $R^8$ or a group: -A-$NR^8R^9$,
$R^1$ to $R^9$ each independently represent hydrogen or isopropyl,
A represents $C_{2-6}$ alkylene,
n represents an integer of 0 to 5,
p and q each independently represent 0 or 1,
a plurality of A may each be identical or different, and when there is a plurality of $R^6$, each $R^5$ may be identical or different,
with the proviso that two or more of $R^1$ to $R^9$ represent isopropyl. In the formula, when a plurality of A is each different, each of a plurality of alkylene groups represented by A are different from each other. When n represents an integer of 2 to 5, the phrase "two or more of $R^1$ to $R^9$ represent isopropyl" may indicate a case where two $R^5$ from among a plurality of $R^5$ represent isopropyl while all of $R^1$ to $R^4$ and $R^8$ to $R^9$ represent hydrogen.

n is an integer of 0 to 5, and more preferably an integer of 0 to 4.

A above represents $C_{2-6}$ alkylene, and preferably $C_{2-4}$ alkylene. Specific examples of these alkylene groups include ethylene, methylethylene, propylene, 1-methylpropylene, 2-methylpropylene, butylene, and the like.

In the present invention, specific examples of IP-polyamine include a polyamine having at least two isopropylamino groups at one or more of the ends. In this case, the IP-polyamine is preferably represented by Formula (1) wherein $R^1$ and $R^2$ represent isopropyl, and $R^3$ and $R^4$ represent hydrogen.

Specific examples of the IP-polyamine include diisopropylated tetraethylenepentamine, diisopropylated spermine, diisopropylated pentaethylenehexamine, diisopropylated hexaethyleneheptamine, diisopropylated triethylenetetramine, and like diisopropylated polyamines; and tetraisopropylated N,N,N',N'-tetrakis(3-aminopropyl)-1,4-butanediamine and like tetraisopropylated polyamines. More specific examples thereof include 1,11-bis(isopropylamino)-3,6,9-triazaundecane, N,N'-bis (3-(isopropylamino)propyl)-1,4-butanediamine, N,N,N',N'-tetrakis (3-(isopropylamino)propyl)-1,4-butanediamine, 1,14-bis (isopropylamino)-3,6,9,12-tetraazatetradecane, 1,17-bis (isopropylamino)-3,6,9,12,15-pentaazaheptadecane, 1,8-bis (isopropylamino)-3,6-diazaoctane, and the like. In the present invention, a diisopropylated polyamine refers to a polyamine in which two or more of the nitrogen atoms of the polyamine are substituted with a total of two isopropyl groups, and a tetraisopropylated polyamine refers to a polyamine in which two or more of the nitrogen atoms of the polyamine are substituted with a total of four isopropyl groups.

The IP-polyamine of the present invention may be produced, for example, by introducing two or more isopropyl groups into a polyamine having a group: —$NH_2$ and a group: —NH—. This polyamine is commercially available or obtained by a well-known method. To introduce isopropyl, a known reaction for introducing alkyl into a group: —$NH_2$ and a group: —NH— may be used. For example, the reaction disclosed in J. Med. Chem. 1986, 29, 376-380, or the like may be referred to. More specific examples include a reaction for reacting 2-halopropane, such as 2-bromopropane and 2-chloropropane, with a polyamine having unsubstituted amino groups at the ends in an alcohol or a solvent mixture of an alcohol and water in the presence of a base, such as potassium carbonate. The amount of 2-halopropane used in this reaction may be 2 to 2 Nmol per 1 mol of the polyamine used as a starting material. The amount of the base used in this reaction may be 2 to 2 Nmol per 1 mol of the polyamine used as a starting material. The N in "Nmol" represents the number of —$NH_2$ groups of the polyamine used as a starting material.

The IP-polyamine preferably has a boiling point of 320° C. or higher at 760 mmHg because it makes it possible to stably use the carbon dioxide separating material at a high temperature (e.g., about 60° C.). If the IP-polyamine has a boiling point of 320° C. or higher at 760 mmHg, even when the boiling point is lowered upon reduction of the pressure (e.g., about 0.2 Pa), the IP-polyamine maintains the state of being loaded on a support. Therefore, the use of the IP-polyamine makes it possible to increase the use temperature to be a temperature higher than an ordinary temperature and efficiently release carbon dioxide. The upper limit of the boiling point of the IP-polyamine is not particularly limited. The upper limit of the boiling point may be, for example, about 500° C. at 760 mmHg.

The IP-polyamine used in the present invention may be used as a mixture or as a single compound after purification.

2. Support

The support used in the present invention is not limited as long as the IP-polyamine can be loaded thereon and as long as it is capable of withstanding carbon dioxide release and recover conditions. Specific examples of the support include mesoporous silica, polymethyl methacrylate, alumina, silica alumina, clay minerals, magnesia, zirconia, zeolites, zeolite-related compounds, natural minerals, waste solids, activated carbons, carbon molecular sieves, mixtures thereof, and the like.

As the support, a commercially available product may be used as is, or those synthesized by a known method may be used. Examples of commercially available products include mesostructured silica MSU-F, produced by Sigma-Aldrich, DIAION (registered trademark) HP2MG, produced by Mitsubishi Chemical Corporation, and the like.

The support is preferably a porous material having a large specific surface area and a large pore volume for loading a large amount of IP-polyamine thereon. The support preferably has a specific surface area of 50 to 1,000 $m^2/g$ and a pore volume of 0.1 to 2.3 $cm^2/g$, and particularly preferably has a specific surface area of 400 to 1,000 $m^2/g$ and a pore volume of 1.5 to 2.3 $cm^3/g$.

The specific surface area and pore volume may be measured by using, for example, a specific surface area/pore size distribution measuring apparatus (ASAP2020, produced by Shimadzu Corporation) using a constant volume method. The following is a more specific example of a gas adsorption measuring method using a specific surface area/pore size distribution measuring apparatus: A sample is pretreated by vacuum evacuation with heating, and about 0.1 g of the measurement sample is placed in a sample tube, followed by heating to 40° C. After performing vacuum evacuation for 6 hours, the sample was cooled to room temperature, followed by measurement of the sample weight. In the measurement, the liquid nitrogen temperature is set, and the pressure range is specified; the specific surface area, pore volume, and pore size may thus be calculated by analyzing the obtained nitrogen adsorption isotherm.

3. Polyamine Carrier

The polyamine carrier used in the present invention is a carrier in which the IP-polyamine is loaded on the support mentioned above.

The polyamine carrier may be produced by mixing an alcohol solution of the IP-polyamine with the support, and stirring the mixture at room temperature, followed by distilling off the alcohol solvent. Examples of the method for distilling off the alcohol solvent include a method for reducing the pressure while heating with an evaporator or the like.

Unlike an aqueous carbon dioxide separating material solution, the IP-polyamine that is loaded on a support can be applied to a pressure swing method (a method in which a carbon dioxide separating material is subjected to reduced pressure conditions to release carbon dioxide), and can also achieve satisfactory results when applied to a temperature swing method (a method in which a carbon dioxide separating material is heated to release carbon dioxide).

4. Carbon Dioxide Separating Material

The carbon dioxide separating material used in the present invention may comprise a binder, in addition to the polyamine carrier, so as to be formed into granulations. By performing granulation using a binder, vibration resistance and wear resistance may be imparted, and the stability in water may be improved.

Examples of the binder used in the present invention include fluororesins (e.g., polytetrafluoroethylene), cellulose derivatives (e.g., hydroxypropylmethyl cellulose, methylcellulose, hydroxypropyl cellulose, carboxymethyl cellulose, hydroxyethyl cellulose, hydroxyethylated starch), mixtures of epoxy resins (e.g., diglycerol polyglycidyl ether and sorbitol polyglycidyl ether) with epoxy resin curing agents (e.g., modified polyamide resins), and the like. Examples also include other polymers (e.g., polyvinyl alcohol, polyethylene oxide, sodium polyacrylate, and polyacrylamide) and the like. These compounds are commercially available, or may be easily produced by a known method.

Examples of commercially available binders include Polyflon PTFE D-210C produced by Daikin Industries, Ltd., Neovisco MC RM4000 produced by Sansho Co., Ltd., AQ nylon P-70 produced by Toray Industries, Inc., Denacol EX-421 produced by Nagase ChemteX Corporation, and the like.

The amount of the binder contained in the carbon dioxide separating material is not particularly limited as long as granulation is possible. The amount is preferably small because the reduction of the amount of the IP-polyamine can be avoided.

When the granulation is performed using a binder, the average particle diameter of granulations is preferably 0.1 to 1.0 mm to reduce the pressure loss at the time that gas is supplied to a packed layer of adsorption material.

The amount of the IP-polyamine relative to the carbon dioxide separating material is not particularly limited. A larger amount of the IP-polyamine relative to the carbon dioxide separating material is presumed to achieve more efficient separation and recovery of carbon dioxide. The lower limit of the amount of the IP-polyamine is preferably 30 wt %, and particularly preferably 40 wt % (weight ratio), relative to the carbon dioxide separating material. The upper limit of the amount of the IP-polyamine may be about 70 wt % (weight ratio), relative to the carbon dioxide separating material.

5. Method for Separating (Recovering) Carbon Dioxide

The target of the method for separating (recovering) carbon dioxide of the present invention is a carbon dioxide-containing gas. Examples thereof include exhaust gases from thermal power plants using coal, heavy oil, natural gas, or other fuels; blast furnaces of ironworks where iron oxide is reduced with coke; converters of ironworks where carbon in pig iron is combusted to produce steel; factory boilers; cement plant kilns; and transportation equipment, such as automobiles, ships, and aircraft, using gasoline, heavy oil, light oil, or other fuels. Examples also include carbon dioxide generated, for example, by people breathing and from energy conversion of apparatuses in an enclosed space, such as deep-submersible vehicles and space stations, and the like.

The method for separating (recovering) carbon dioxide of the present invention is characterized in that it uses the carbon dioxide separating material described above.

The method for separating (recovering) carbon dioxide of the present invention comprises the steps of: bringing target gas into contact with the carbon dioxide separating material to allow carbon dioxide to be absorbed into the carbon dioxide separating material (step 1); and releasing the carbon dioxide from the carbon dioxide separating material into which carbon dioxide is absorbed in the above step (step 2).

The amount and temperature of the carbon dioxide in the target gas in step 1 are not particularly limited as long as the carbon dioxide separating material is capable of withstanding the conditions. For example, the carbon dioxide partial pressure may be 100 kPa or less, and the temperature may be 20 to 600° C. Specific examples include expected conditions of use in a thermal power station and the like (e.g., carbon dioxide partial pressure: 7 to 100 kPa; temperature: 40 to 60° C.), expected conditions of use in a space station and the like (e.g., carbon dioxide partial pressure: 0 to 1 kPa; temperature: 20 to 25° C.), and the like. The target gas may be atmospheric or pressurized.

The target gas used in step 1 may contain water vapor. Even if the target gas contains water vapor, the carbon dioxide separating material of the present invention adsorbs carbon dioxide in an excellent manner, and it is thus possible to omit a dehumidification operation.

Examples of the method for releasing carbon dioxide in step 2 include (A) a method for releasing carbon dioxide by subjecting the carbon dioxide separating material to reduced pressure conditions (a pressure swing method), (B) a method for releasing carbon dioxide by bringing carbon dioxide-free inert gas into contact with the carbon dioxide separating material, and (C) a method for releasing carbon dioxide by heating the carbon dioxide separating material (a temperature swing method).

In method (A) above, the pressure is preferably lowered to about 0.2 Pa in terms of the release amount of carbon dioxide, as well as the stability of the carbon dioxide separating material. The carbon dioxide separating material or a container containing the carbon dioxide separating material may be heated at the time that the pressure is reduced. The heating may be performed to a temperature of about 60° C., and the pressure at this time is preferably lowered to about 0.5 Pa.

In method (B) above, carbon dioxide-free inert gas is brought into contact with the carbon dioxide separating material. This lowers the carbon dioxide partial pressure, making it possible to release carbon dioxide. The inert gas is not limited as long as the carbon dioxide separating material is stable in the gas, and as long as the gas is free from carbon dioxide. Examples thereof include argon, nitrogen, and the like.

In method (C) above, the temperature is increased from the temperature at the time that carbon dioxide is absorbed, and in this manner, carbon dioxide is released. In this method, the temperature at the time that carbon dioxide is absorbed may be 20 to 25° C., and the temperature at the time that carbon dioxide is released may be about 60° C.

EXAMPLES

The following describes the present invention in more detail with reference to Examples. However, the present invention is not limited to these Examples. The loading (wt. %) of polyamine refers to the weight of polyamine expressed in weight percentage relative to the weight of the carbon dioxide separating material from which the weight of carbon dioxide absorbed in the carbon dioxide separating material is excluded.

In the Examples below, the following apparatus was used for measuring the physicochemical properties of a compound.

Liquid chromatograph mass spectrometer (LC-MS): Alliance LC/MS system produced by Nihon Waters K.K.

In the Examples, the expression "IP-TEPA (40)/MSU-H" and the like refers to "amine species (content [wt. %] of amine species)/the name of support."

Synthesis of Isopropylated Amine

Production Example 1

Synthesis of Diisopropylated Tetraethylenepentamine (Hereinbelow Abbreviated as "IP-TEPA")

IP-TEPA was produced as follows by modifying the synthesis procedure disclosed in J. Med. Chem. 1986, 29, 376-380.

1 mol of tetraethylenepentamine (TEPA) and a stirring bar were placed in a 2-L flask equipped with a reflux tube, and 2.0 mol of potassium carbonate dissolved in a trivial amount of water was added to the flask. While the flask was ice-cooled, the mixture was stirred, to which 400 mL of ethanol in which 2.0 mol of 2-bromopropane was dissolved was slowly added dropwise. After the completion of dropwise addition of the ethanol solution, the temperature of the flask was brought back to room temperature, and the reaction solution was stirred at room temperature for 36 hours. After the completion of the reaction was confirmed by liquid chromatograph mass spectrometer (LC-MS), water and ethanol were removed under reduced pressure at 40° C. to obtain a residue. Methanol was added to the obtained residue, and insoluble matter was filtered off. Then, methanol was removed under reduced pressure to thereby obtain 259.79 g of IP-TEPA as a light yellow transparent liquid (yield: 95%).

The following shows the physicochemical properties of the obtained compound. LC-MS: actual measurement value m/z 274 [M+H]$^+$ with respect to the theoretical molecular weight ($C_{14}H_{35}N_5$) 273 Boiling point (estimate): 348° C./760 mmHg $^1$H-NMR (CDCl$_3$, 400 MHz) δ ppm 2.79-2.72 (2H, m), 2.71-2.64 (16H, m), 1.69 (4H, br, s), 1.05 (12H, d) $^{13}$C-NM (CDCl$_3$, 100 MHz) δ ppm 49.4 (CH$_2$×6), 48.7 (CH×2), 47.0 (CH$_2$×2), 23.0 (CH$_3$×4).

These data confirm that IP-TEPA is a compound in which two isopropyl groups were introduced into TEPA.

Production Example 2

Synthesis of Diisopropylated Spermine (Hereinbelow Abbreviated as "IP-Spermine")

25 g (0.12 mol) of spermine and a stirring bar were placed in a 500-mL flask equipped with a reflux tube, and 0.49 mol of potassium carbonate dissolved in a trivial amount of water was added to the flask. While the flask was ice-cooled, the mixture was stirred, to which 150 mL of ethanol in which 60.78 g (0.49 mol) of 2-bromopropane was dissolved was slowly added dropwise. After the completion of dropwise addition of the ethanol solution, the temperature of the flask was brought back to room temperature, and the reaction solution was stirred at room temperature for 36 hours. After the completion of the reaction, water and ethanol were removed under reduced pressure at 40° C. to obtain a residue. Methanol was added to the obtained residue, and insoluble matter was filtered off. Methanol was removed under reduced pressure to thereby obtain 29.42 g of IP-spermine as a colorless liquid (yield: 83).

The following shows the physicochemical properties of the obtained compound. LC-MS: actual measurement value m/z 287 [M+H]$^+$ with respect to the theoretical molecular weight ($C_{16}H_{38}N_4$) 286 Boiling point (estimate): 335° C./760 mmHg $^1$H-NMR (CDCl$_3$, 400 MHz) δ ppm 2.79-2.75 (2H, m), 2.68-2.61 (12H, m), 1.68-1.65 (4H, m), 1.60-1.40 (4H, m), 1.21 (4H, br), 1.05 (12H, d) $^{13}$C-NMR (CDCl$_3$, 100 MHz) δ ppm 49.9 (CH$_2$×2), 48.7 (CH×2), 48.5 (CH$_2$×2), 46.1 (CH$_2$×2), 30.8 (CH$_2$×2), 27.9 (CH$_2$×2), 23.0 (CH$_3$×4).

These data confirm that IP-spermine is a compound in which two isopropyl groups were introduced into spermine.

Production Example 3

Synthesis of Tetraisopropylated N,N,N',N'-Tetrakis (3-Aminopropyl)-1,4-Butanediamine (Hereinbelow Abbreviated as "IP-DAB-Am-4")

25 g (78.98 mmol) of N,N,N',N'-tetrakis(3-aminopropyl)-1,4-butanediamine (DAB-Am-4) and a stirring bar were placed in a 500-mL flask equipped with a reflux tube, and 0.316 mol of potassium carbonate dissolved in a trivial amount of water was added to the flask. While the flask was ice-cooled, the mixture was stirred, to which 100 mL of ethanol in which 38.86 g (0.316 mol) of 2-bromopropane was dissolved was slowly added dropwise. After the completion of dropwise addition of the ethanol solution, the temperature of the flask was brought back to room temperature, and the reaction solution was stirred at room temperature for 48 hours. After the completion of the reaction, water and ethanol were removed under reduced pressure at 40° C. to obtain a residue. Methanol was added to the obtained residue, and insoluble matter was filtered off. Methanol was removed under reduced pressure to obtain a crude product of IP-DAB-Am-4. The residual solvent was further removed from the obtained crude product under high vacuum to thereby obtain 32.92 g of IP-DAB-Am-4 as a colorless liquid (yield: 86%).

The following shows the physicochemical properties of the obtained compound. LC-MS: actual measurement value m/z 485 [M+H]$^+$ with respect to the theoretical molecular weight ($C_{28}H_{66}N_6$) 484 Boiling point (estimate): 451°

C./760 mmHg $^1$H-NMR (CDCl$_3$, 400 MHz) δ ppm 2.78-2.72 (4H, m), 2.62-2.58 (8H, m), 2.45-2.42 (12H, m), 2.38 (4H, br, s), 1.63-1.59 (8H, m), 1.40-1.29 (4H, m), 1.05 (24H, d) $^{13}$C-NMR (CDCl$_3$, 100 MHz) δ ppm 54.0 (CH$_2$×2), 52.4 (CH$_2$×4), 48.8 (CH×4), 46.3 (CH$_2$×4), 27.7 (CH$_2$×4), 25.0 (CH$_2$×2), 23.0 (CH$_3$×8).

These data confirm that IP-DAB-Am-4 is a compound in which four isopropyl groups were introduced into DAB-Am-4.

Production Example 4

Synthesis of Support (MSU-H)

125 g of P123 (triblock copolymer P123 PEO20PPO70PEO20, produced by Sigma-Aldrich) was dissolved in 3.5 L of water. 50 mL of acetic acid was added to the resulting aqueous solution, and after 20 minutes of stirring, 181 g of a sodium silicate solution (sodium silicate solution No. 3, produced by KISHIDA CHEMICAL Co., Ltd.) was added dropwise at a rate of 10 mL/30 seconds. After the completion of dropwise addition, the stirring was halted, and the mixture was heated to 40° C. Subsequently, the resulting product was allowed to stand for 24 hours, then heated to 100° C., and was then allowed to stand for another 24 hours. The reaction product was collected by filtration, and sufficiently washed with water. Thereafter, the resulting product was dried at 80° C. overnight, and calcined at 500° C. for 6 hours to obtain 60 g of a target calcined product of mesoporous silica (MSU-H).

The specific surface area, pore size, and pore volume of the obtained support MSU-H were measured using a specific surface area/pore size distribution measuring apparatus (ASAP2020, produced by Shimadzu Corporation). The results confirm that the specific surface area was 780 m$^2$/g, the pore size was 11 nm, and the pore volume was 1.5 mL/g.

Production of Carbon Dioxide Separating Material

Example 1

IP-TEPA (60)/MSU-F

The IP-TEPA obtained in Production Example 1 was quantitatively weighed to be 60 wt % of the carbon dioxide separating material and dissolved in 20 g of methanol (special grade, produced by Wako Pure Chemical Industries, Ltd.) weighed in a 300-cc pear-shaped flask. The resulting product was added to 10 g of a separately weighed support MSU-F (mesopore silica produced by Sigma-Aldrich; specific surface area: 550 m$^2$/g; pore size: 20 nm; pore volume: 2.0 mL/g), and stirred at room temperature for 2 hours. Thereafter, the pressure in the system was reduced to 0.03 MPa while the resulting product was heated to 60° C. using a rotary evaporator (N-1000, produced by Tokyo Rikakikai Co., LTD.) to remove the methanol solvent, thereby preparing a carbon dioxide separating material in which amine was uniformly loaded onto the support. For the removal of the methanol solvent, the total weight of the flask, reagents, and the like were weighed beforehand, and when the weight corresponding to the weight of the methanol solvent, i.e., 20 g, was confirmed to be reduced, the preparation was considered to be completed. The prepared carbon dioxide separating material was kept in a stoppered pear-shaped flask in a desiccator until it was subjected to a test for evaluating the carbon dioxide absorption performance.

Example 2

IP-Spermine (40)/PMMA

The carbon dioxide separating material was prepared and kept as in Example 1, except that the IP-spermine obtained in Production Example 2 was quantitatively weighed to be 40 wt % of the carbon dioxide separating material, in place of the IP-TEPA, and that 10 g of polymethylmethacrylate beads (DIAION (registered trademark) HP2MG, produced by Mitsubishi Chemical Corporation; effective diameter: 0.3 mm or more; specific surface area: 570 m$^2$/g; pore size: 19 nm; and pore volume: 1.3 mL/g) were used as a support in place of MSU-F.

Example 3

IP-DAB-Am-4 (40)/MSU-F

The carbon dioxide separating material was prepared and kept as in Example 1, except that the IP-DAB-Am-4 obtained in Production Example 3 was quantitatively weighed to be 40 wt % of the carbon dioxide separating material, in place of IP-TEPA.

Example 4

The same procedure was followed as in Example 1, except that MSU-H obtained in Production Example 4 was used in place of MSU-F. In this manner, IP-TEPA (40)/MSU-H was obtained as a granulation starting material. 20.00 g of the obtained IP-TEPA (40)/MSU-H was sufficiently mixed with 1.74 g of polyflon (PTFE D210C, produced by Daikin Industries, Ltd.) (8.0 wt % relative to the weight of the granular composition). Next, while the obtained mixture was sufficiently stirred by hand, 39.0 g of water (195 parts by weight per 100 parts by weight of granulation starting material) was gradually added to obtain a water-containing granulable composition with an appropriate adherence property. The obtained wet composition was dried under reduced pressure at 60° C. for 2 hours using a rotary evaporator to remove water. The resulting product was then passed through a 60-mesh sieve and a 100-mesh sieve, and the granular composition that remained on a 100-mesh sieve was obtained.

Example 5

The same procedure was followed as in Example 4 to obtain IP-TEPA (40)/MSU-H. Separately, 5.00 g of 10 wt % aqueous water-soluble nylon P-70 (AQ nylon, a modified polyamide resin, produced by Toray Industries, Inc.) solution (5.0 wt % based on pure P-70 relative to the granulation composition), 1.25 g of 20.0 wt % aqueous sorbitol polyglycidyl ether (Denacol EX-421, produced by Nagase ChemteX Corporation) solution, and 7.85 g of water were blended to obtain a binder formulation. The obtained binder formulation was gradually added to 9.25 g of IP-TEPA (40)/MSU-H while being sufficiently stirred by hand. Then, 0.47 g of water was added to the obtained mixture, and a granulable composition with an appropriate adherence property was prepared. The obtained wet composition was dried under reduced pressure at 60° C. for 2 hours using a rotary evaporator to remove water. The resulting product was then passed through a 60-mesh sieve and a 100-mesh sieve, and the granular composition that remained on a 100-mesh sieve was obtained.

Example 6

IP-DAB-Am-4 (60)/MSU-F was obtained as in Example 3, except that IP-DAB-Am-4 was quantitatively weighed to be 60 wt % of the carbon dioxide separating material. 0.2 g of hydroxypropylmethyl cellulose (HPMC) (NEOVISCO MC RM4000, produced by Sansho Co., Ltd.) (8.0 wt % relative to the composition) was added to 2.5 g of the IP-DAB-Am-4 (60)/MSU-F, and sufficiently mixed. While the resulting mixture was sufficiently mixed by hand, 1.4 g of water (56 parts by weight relative to 100 parts by weight of the starting material composition) was gradually added to the obtained mixture, and a granulable composition with an appropriate adherence property was prepared. The obtained wet composition was dried under reduced pressure at 60° C. for 2 hours using a rotary evaporator to remove water. The resulting product was then passed through a 60-mesh sieve to obtain the granular composition that remained on a 100-mesh sieve.

Examples 7 to 12 and Comparative Examples 1 to 7

The carbon dioxide separating materials of Examples 7 to 12 were synthesized as in Examples 1 to 6, except that the compositions shown in the following Table 1 were used. The carbon dioxide separating materials of Comparative Examples 1 to 7 were synthesized as in Examples 1 to 3, except that the compositions shown in the following Table 1 were used.

Table 1 below summarizes the compositions of the carbon dioxide separating materials of the Examples and Comparative Examples,

TABLE 1

| | | Amine content (wt %) | Type of amine | Support | Binder |
|---|---|---|---|---|---|
| Examples | Ex. 1 | 60 | IP-TEPA | MSU-F | None |
| | Ex. 2 | 40 | IP-Spermine | PMMA | None |
| | Ex. 3 | 40 | IP-DAB-Am-4 | MSU-F | None |
| | Ex. 4 | 37 | IP-TEPA | MSU-H | PTEE: 7.5 wt % |
| | Ex. 5 | 37 | IP-TEPA | MSU-H | AQ nylon P-70: 5 wt % Denacol Ex-421: 2.5 wt % |
| | Ex. 6 | 56 | IP-DAB-Am-4 | MSU-F | MCRM4000: 8 wt % |
| | Ex. 7 | 40 | IP-TEPA | MSU-H | None |
| | Ex. 8 | 40 | IP-TEPA | PMMA | None |
| | Ex. 9 | 40 | IP-Spermine | PMMA | None |
| | Ex. 10 | 40 | IP-DAB-Am-4 | PMMA | None |
| | Ex. 11 | 37 | IP-TEPA | MSU-H | MCRM4000: 8 wt % |
| | Ex. 12 | 56 | IP-DAB-Am-4 | MSU-F | MCRM4000: 8 wt % |
| Comparative Examples | Comp. Ex. 1 | 40 | TEPA | MSU-H | None |
| | Comp. Ex. 2 | 40 | Spermine | MSU-H | None |
| | Comp. Ex. 3 | 40 | DAB-Am-4 | MSU-H | None |
| | Comp. Ex. 4 | 40 | TEPA | MSU-H | None |
| | Comp. Ex. 5 | 40 | Spermine | MSU-H | None |
| | Comp. Ex. 6 | 40 | DAB-Am-4 | MSU-H | None |
| | Comp. Ex. 7 | 40 | TEPA | PMMA | None |

Evaluation Test

The amount of carbon dioxide absorbed in the carbon dioxide separating materials of the Examples and Comparative Examples at each temperature was measured by measuring the equilibrium absorption amount at each pressure with a constant volume method using ASAP2020 produced by Shimadzu Corporation. This apparatus can calculate a specific surface area and pore size by measuring the amount of gas adsorption in accordance with the principle disclosed in JIS Z 8831-2 and JIS Z 8831-3. In accordance with the same principle, the amount of carbon dioxide absorption can be measured using this apparatus. The measuring method in each evaluation test was performed as follows unless otherwise specified.

After about 0.1 g of measurement sample was weighed into a sample tube, the sample was pretreated by 6-hour vacuum evacuation, and the sample temperature was maintained at either 20, 40, or 60° C. Then, carbon dioxide was gradually introduced thereto, the pressure upon equilibrium was specified to be a pressure within a range up to 100 kPa, and the measurement was performed. In this manner, the relationship between the carbon dioxide partial pressure and the amount of carbon dioxide absorption was obtained at each measurement temperature as shown in FIG. 1.

The amount of carbon dioxide released (recovered) upon pressure reduction refers to the amount of carbon dioxide absorption achieved with the use of the carbon dioxide separating material from which $CO_2$ was released (the amount of $CO_2$ released upon pressure reduction will be the amount of $CO_2$ absorbed).) Specifically, a sample in which carbon dioxide was absorbed was manually subjected as is to evacuation under reduced pressure for 5 minutes or 20 minutes with a turbo molecular pump; thereafter, carbon dioxide was introduced again according to the method described above, and the isotherm was measured. In this manner, the amount of carbon dioxide released (recovered) upon pressure reduction was found. Tables 2 to 5 summarize the amount of carbon dioxide absorption at a carbon dioxide partial pressure of 0.7 kPa or 100 kPa as a comparison. The ultimate vacuum after 5 minutes of pressure reduction was 0.5 Pa, and the ultimate vacuum after 20 minutes of pressure reduction was 0.2 Pa.

Evaluation Test 1

With respect to the carbon dioxide separating materials obtained in Examples 1 to 6 and Comparative Examples 1 to 3, the amount of carbon dioxide absorbed and the amount of carbon dioxide released (recovered) upon pressure reduction were measured. Table 2 shows the results.

In the following tables, the unit of the amount of $CO_2$ absorption is the amount (g) of $CO_2$ absorption per 1 kg of the carbon dioxide separating material. The $CO_2$ absorption amount (g/kg) represented by (A) refers to the $CO_2$ absorption amount with respect to a fresh sample at each temperature and each pressure. The amount of $CO_2$ released (recovered) upon pressure reduction represented by (B) refers to the value calculated based on the $CO_2$ absorption amount obtained under the same conditions by using the carbon dioxide separating material subjected to reduced pressure with a vacuum pump for 5 or 20 minutes. The amount of (B) corresponds to the absorption and release (recovery) amount when absorption and release were repeated. Regarding (B), the same operation was repeated 3 times to confirm that the same value was obtained.

TABLE 2

| | Carbon dioxide seperating material | | | | CO$_2$ Absorption amount (A) (g/kg) at 20° C. and 0.7 kPa | Release (recovery) amount (B) (g/kg) after 20 minutes of pressure reduction | Release rate (B)/(A) × 100 (%) |
|---|---|---|---|---|---|---|---|
| | Amine content (wt. %) | Type of amine | Support | Binder | | | |
| Ex. 1 | 60 | IP-TEPA | MSU-F | None | 114 | 65 | 57 |
| Ex. 2 | 40 | IP-Spermine | PMMA | None | 87 | 52 | 60 |
| Ex. 3 | 40 | IP-DAB-Am-4 | MSU-F | None | 66 | 47 | 71 |
| Ex. 4 | 37 | IP-TEPA | MSU-B | PTEE: 7.5 wt % | 64 | 28 | 43 |
| Ex. 5 | 37 | IP-TEPA | MSU-H | AQ nylon P-70: 5 wt % Denacol EX-421: 0.5 wt % | 50 | 19 | 38 |
| Ex. 6 | 56 | IP-DAB-Am-4 | MSU-F | MCRM4000: 8 wt % | 56 | 47 | 84 |
| Comp. Ex. 1 | 40 | TEPA | MSU-H | None | 55 | 6 | 11 |
| Comp. Ex. 2 | 40 | Spermine | MSU-H | None | 46 | 23 | 28 |
| Comp. Ex. 3 | 40 | DAB-Am-4 | MSU-H | None | 35 | 16 | 45 |

After the carbon dioxide absorption amount reached equilibrium at 0.7 kPa, the pressure was reduced for 20 minutes which resulted in the release amount of only about 6 g/kg in Comparative Example 1, which used TEPA as the amine compound. The release rate relative to the initial absorption amount was about 11%. In contrast, the release amount was 28 g/kg in Example 4, which used IP-TEPA, and the release rate relative to the initial absorption amount was 43%, which is an increase of about 4 times. These results are shown in Table 2.

In accordance with an increase in the absorption amount with respect to the carbon dioxide separating material in which 60 wt % of IP-TEPA was loaded, the amount of CO$_2$ released (recovered) in vacuum under reduced pressure was also increased to 65 g/kg (release rate: 57%). The detailed reasons for the release rate increases in IP-TEPA are not known. It is presumed that a high-density amine loading makes it possible to easily form a carbamate; therefore, carbon dioxide was efficiently absorbed, and the release (recovery) amount also increased.

Evaluation Test 2

Each value was measured as in Evaluation Test 1, except that the carbon dioxide separating materials obtained in Examples 7 to 12 and Comparative Examples 4 to 6 were used, the amount of CO$_2$ absorption was measured at 40° C. and 100 kPa, and the amount of desorption was measured at 40° C. Table 3 below shows the results.

TABLE 3

| | Carbon dioxide separationg material | | | | CO$_2$ Absorption amount (A) (g/kg) at 40° C. and 100 kPa | Release (recovery) amount (B) (g/kg) after 20 minutes of pressure reduction | Release rate (B)/(A) × 100 (%) |
|---|---|---|---|---|---|---|---|
| | Amine content (wt %) | Type of amine | Support | Binder | | | |
| Ex. 7 | 40 | IP-TEPA | MSU-B | None | 84 | 77 | 92 |
| Ex. 8 | 40 | IP-TEPA | PMMA | None | 103 | 96 | 93 |
| Ex. 9 | 40 | IP-Spermine | PMMA | None | 92 | 92 | 100 |
| Ex. 10 | 40 | IP-DAB-Am-4 | PMMA | None | 64 | 64 | 100 |
| Ex. 11 | 37 | IP-TEPA | MSU-H | MCRM4000: 8 wt % | 76 | 62 | 82 |
| Ex. 12 | 56 | IP-DAB-Am-4 | MSU-F | MCRM4000: 8 wt % | 95 | 81 | 85 |
| Comp. Ex. 4 | 40 | TEPA | MSU-H | None | 75 | 26 | 35 |
| Comp. Ex. 5 | 40 | Spermine | MSU-H | None | 69 | 47 | 68 |
| Comp. Ex. 6 | 40 | DAB-Am-4 | MSU-H | None | 63 | 46 | 73 |

Evaluation Test 3

The carbon dioxide separating materials obtained in Example 7 IP-TEPA (40)/MSU-H and Comparative Example 1 (TEPA(40)/MSU-H) were used and the $CO_2$ absorption amount, the $CO_2$ release (recovery) amount, and release rate were measured at each temperature (20° C., 40° C., and 60° C.). Table 4 below shows the results.

TABLE 4

| | | Carbon dioxide separating material | | | | | |
|---|---|---|---|---|---|---|---|
| | | Ex. 7 IP-TEPA (40)/MSU-H (without binder) | | | Comp. Ex. 1 TEPA (40)/MSU-H (without binder) | | |
| | | $CO_2$ Absorption amount (A) (g/kg) at 100 kPa | Release (recovery) amount (B) (g/kg) after 20 minutes of pressure reduction | Release rate (B)/(A) × 100 (%) | $CO_2$ Absorption amount (A) (g/kg) at 100 kPa | Release (recovery) amount (B) (g/kg) after 20 minutes of pressure reduction | Release rate (B)/(A) × 100 (%) |
| Temperature | 20° C. | 79 | 46 | 58 | 70 | 17 | 24 |
| | 40° C. | 84 | 79 | 94 | 75 | 26 | 35 |
| | 60° C. | 92 | 88 | 96 | 110 | 84 | 76 |

Evaluation Test 4

The carbon dioxide separating materials obtained in Example 7 (IP-TEPA (40)/MSU-H) and Comparative Example 1 (TEPA (40)/MSU-H) were used to measure the $CO_2$ release (recovery) amount, and the release rate with a pressure reduction time of 5 or 20 minutes. Table 5 shows the results obtained at 40° C. FIG. 1 shows the absorption isotherms at each temperature.

2 g of the carbon dioxide separating material of Example 8 (IP-TEPA (40)/PMMA) or Example 9 (IP-Spermine (40)/PMMA) was placed in a reaction tube and pretreated by dry degassing in an argon stream (30 cm$^3$·min$^{-1}$) at 100° C. for 6 hours. Thereafter, the reaction tube was kept warm at 23° C. Then, the input gas was switched to an $H_2O$—Ar mixed gas (total flow rate: 30 cm$^3$·min$^{-1}$), allowing the carbon dioxide separating material to absorb water. When the water absorption reached saturation, the input gas was switched to $CO_2$ (0.7%) —$H_2O$—$N_2$ (balance) (total flow rate: 30 cm$^3$·min$^{-1}$), and at the same time, the change of the outlet gas composition was measured over time by gas chromatography (GC-390 or GC-323 produced by GL Sciences Inc.) to obtain a break-point curve. After the amount of carbon dioxide absorption reached saturation, the input gas was switched to argon (30 cm$^3$·min$^{-1}$), and the change of the outlet gas composition was continuously measured over time by gas chromatography. In this measurement, carbon dioxide was released by introducing argon gas to reduce the carbon dioxide partial pressure in the system, instead of reducing pressure using a vacuum pump.

The absorption amount was calculated from the integration of the time since when the $CO_2$ absorption was initiated until when the saturation was achieved, and the change in outlet concentration. The release amount of $CO_2$ was calculated from the integration of the time since when the gas was switched to argon gas until when almost no carbon dioxide was detected from the outlet, and the change in outlet concentration. Table 6 below shows the results. The results under dry conditions were obtained through the measurement using the ASAP2020 mentioned above.

TABLE 5

| | | Carbon dioxide separating material | | | | | |
|---|---|---|---|---|---|---|---|
| | | Ex. 7 IP-TEPA (40)/MSU-H (without binder) | | | Comp. Ex. 1 TEPA (40)/MSU-H (without binder) | | |
| | | $CO_2$ Absorption amount (A) (g/kg) at 100 kPa | Release (recovery) amount (B) (g/kg) after pressure reduction at 40° C. | Release rate (B)/(A) × 100 (%) | $CO_2$ Absorption amount (A) (g/kg) at 100 kPa | Release (recovery) amount (B) (g/kg) after pressure reduction at 40° C. | Release rate (B)/(A) × 100 (%) |
| Pressure reduction time | 5 min | 84 | 70 | 83 | 75 | 20 | 27 |
| | 20 min | | 79 | 94 | | 26 | 35 |

Evaluation Test 5

(Carbon Dioxide Absorption-Release Measurement Using a Fixed Bed Flow Test Apparatus)

(1) Analysis of the Influence of Water Vapor

The carbon dioxide separating material is used in an indoor space or under conditions in which carbon dioxide in a mixed gas, such as exhaust gas, containing carbon dioxide and water vapor is absorbed and released. Therefore, the influence of water vapor was analyzed. The amount of carbon dioxide absorption under humidification conditions was measured using a fixed bed flow test apparatus (produced by GL Sciences Inc.)

TABLE 6

| | | Carbon dioxide separating material | | | | | |
|---|---|---|---|---|---|---|---|
| | | Ex. 8 IP-TEPA (40)/PMMA (without binder) | | | Ex. 9 IP-Spermine (40)/PMMA (without binder) | | |
| | | $CO_2$ absorption amount (A) (g/kg) at 0.7 kPa | $CO_2$ Release (recovery) amount (B) (g/kg) | Release rate (B)/(A) × 100 (%) | $CO_2$ absorption amount (A) (g/kg) at 0.7 kPa | $CO_2$ Release (recovery) amount (B) (g/kg) | Release rate (B)/(A) × 100 (%) |
| presence of water vapor | Dry condition | 65 | 32 | 50 | 87 | 52 | 60 |
| | In the presence of water vapor | 87 | 64 | 73 | 91 | 75 | 82 |

(2) Analysis of $CO_2$ Release (Recovery) by Heating

To analyze the applicability to a temperature swing method, the $CO_2$ release (recovery) by heating with respect to the carbon dioxide separating material of Example 8 (IP-TEPA (40)/PNA) or Comparative Example 7 (TEPA (40)/PMMA) was analyzed using a fixed bed flow test apparatus (produced by GL Sciences Inc.). The $CO_2$ release (recovery) by heating was performed as follows. Specifically, a carbon dioxide-containing mixed gas ($CO_2$ (7,000 ppm)-$N_2$ balance) was introduced at 23° C. using the fixed fluid bed test apparatus mentioned above. Then, after the amount of carbon dioxide absorption reached saturation, argon gas was introduced, and at the same time, the temperature was increased at a heating rate of 10° C./min to 60° C. The temperature was maintained for 30 minutes, and in the meantime, the release amount of carbon dioxide was measured. Table 7 below shows the results.

TABLE 7

| | Carbon dioxide seperating material | | | $CO_2$ Absorption amount (A) (g/kg) at 23° C. and 0.7 kPa | Release (recovery) amount (B) (g/kg) at 60° C. | Release rate (B)/(A) × 100 (%) |
|---|---|---|---|---|---|---|
| | Amine content (wt %) | Type of amine | Support | Binder | | | |
| Ex. 8 | 40 | IP-TEPA | PMMA | None | 87 | 87 | 100 |
| Comp. Ex. 7 | 40 | TEPA | PMMA | None | 96 | 50 | 52 |

The invention claimed is:

1. A carbon dioxide separating material comprising a polyamine carrier in which a polyamine having at least two isopropyl groups on one or more of the nitrogen atoms is loaded on a support.

2. The carbon dioxide separating material according to claim 1, wherein the polyamine is represented by Formula (1):

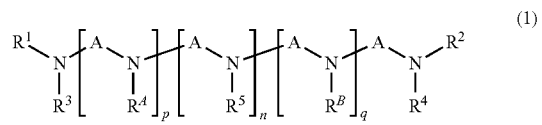

(1)

wherein $R^A$ represents $R^6$ or a group: -A-NR$^6$R$^7$,
$R^B$ represents $R^8$ or a group: -A-NR$^8$R$^9$,
$R^1$ to $R^9$ each independently represent hydrogen or isopropyl, A represents $C_{2-6}$ alkylene,
n represents an integer of 0 to 5,
p and q each independently represent 0 or 1,
wherein
a plurality of A may each be identical or different, and when there is a plurality of $R^5$, each $R^5$ may be identical or different,
with the proviso that two or more of 1e to $R^9$ of the formula represent isopropyl.

3. The carbon dioxide separating material according to claim 1, wherein the polyamine has a boiling point of 320° C. or higher at 760 mmHg.

4. The carbon dioxide separating material according to claim 1, wherein the polyamine is at least one member selected from the group consisting of diisopropylated tetraethylenepentamine, diisopropylated spermine, tetraisopropylated N,N,N',N'-tetrakis(3-aminopropyl)-1,4-butanediamine, diisopropylated pentaethylenehexamine, diisopropylated hexaethyleneheptamine, and diisopropylated triethylenetetramine.

5. The carbon dioxide separating material according to claim 1, wherein the support is mesoporous silica, polymethyl methacrylate, alumina, silica alumina, clay minerals, magnesia, zirconia, a zeolite, a zeolite-related compound, a natural mineral, a waste solid, an activated carbon, a carbon molecular sieve, or a mixture thereof.

6. The carbon dioxide separating material according to claim 1, wherein the support has a specific surface area (BET) of 50 m²/g or more and 1,000 m²/g or less, and a pore volume of 0.1 to 2.3 cm³/g.

7. A carbon dioxide separating material comprising granulations containing a polyamine carrier having at least two isopropyl groups on one or more of the nitrogen atoms and a binder.

8. The carbon dioxide separating material according to claim 7, wherein the binder is at least one member selected from the group consisting of fluororesins, cellulose derivatives, and mixtures of epoxy resins with epoxy resin curing agents.

9. A method for separating or recovering carbon dioxide, the method comprising the steps of:
   bringing target gas into contact with the carbon dioxide separating material of claim 1 to allow carbon dioxide to be absorbed into the carbon dioxide separating material (step 1); and
   releasing carbon dioxide from the carbon dioxide separating material into which carbon dioxide is absorbed in step 1 (step 2),
   wherein step 2 comprises any one of the following:
   (A) a method for releasing carbon dioxide by subjecting the carbon dioxide separating material to reduced pressure conditions (a pressure swing method),
   (B) a method for releasing carbon dioxide by bringing carbon dioxide-free inert gas into contact with the carbon dioxide separating material, and
   (C) a method for releasing carbon dioxide by heating the carbon dioxide separating material (a temperature swing method).

10. The method for releasing or recovering carbon dioxide according to claim 9, wherein the target gas has a temperature of 20 to 60° C. and a carbon dioxide partial pressure of 100 kPa or less, and wherein step 2 above comprises method (A).

* * * * *